United States Patent [19]

Rohloff

[11] 4,303,161
[45] Dec. 1, 1981

[54] HANDLING MEANS FOR USE IN HANDLING PLANAR OBJECTS

[76] Inventor: Joachim L. Rohloff, Shvil Hashita 4, Naharya, Israel

[21] Appl. No.: 111,702

[22] Filed: Jan. 14, 1980

Related U.S. Application Data

[63] Continuation of Ser. No. 902,903, May 5, 1978, abandoned.

[30] Foreign Application Priority Data

May 10, 1977 [ZA] South Africa ..................... 77/2778

[51] Int. Cl.³ ..................... B65D 69/00; B65D 71/00
[52] U.S. Cl. ..................... 206/578; 206/232; 206/456; 206/485
[58] Field of Search ............ 206/455, 456, 485, 216, 206/578, 217, 218, 232; 229/27, 15, 33, 38, 40, 44 R

[56] References Cited

U.S. PATENT DOCUMENTS

| | | | |
|---|---|---|---|
| 1,367,600 | 2/1921 | Hirsch | 206/485 |
| 2,256,995 | 9/1941 | Andres | 206/485 |
| 3,157,343 | 11/1964 | Kendall | 229/44 R |
| 3,323,251 | 6/1967 | Henry | 206/216 |
| 3,326,444 | 6/1967 | Farquhar et al. | 229/27 |
| 4,025,039 | 5/1977 | Croll et al. | 206/485 |

FOREIGN PATENT DOCUMENTS

| | | | |
|---|---|---|---|
| 1033105 | 4/1953 | France | 206/485 |
| 423844 | 7/1949 | Italy | 206/485 |

Primary Examiner—Joseph Man-Fu Moy
Attorney, Agent, or Firm—Stevens, Davis, Miller & Mosher

[57] ABSTRACT

Handling means for use in handling photographic slides, and comprising a blank having a plurality of laterally spaced fold lines to divide the blank into a series of outer wall panels, the blank being foldable about the fold lines to form a holder for holding a plurality of photographic slides in side-by-side relationship, the blank further having first and second inner panels which are receivable within the holder formed from the folded blank to divide the holder into three compartments, the first and second inner panels having a plurality of laterally spaced slots which are aligned with each other, for receiving the slides and locating them in position in the holder. The blank further has a plurality of package fold lines at suitably spaced intervals to divide the blank into alternate narrow and wide package panels to allow the blank to be folded into a flattened rectangular package for posting processed slides contained therein in stacks.

6 Claims, 9 Drawing Figures

HANDLING MEANS FOR USE IN HANDLING PLANAR OBJECTS

This is a continuation of application Ser. No. 902,903 filed May 5, 1978, now abandoned.

This invention relates to handling means for use in handling planar objects, and to a photographic slide holder for holding planar objects in the form of photographic slides.

According to the invention there is provided handling means for use in handling planar objects, and comprising a blank having a plurality of laterally spaced fold lines to divide the blank into a series of outer wall panels, the blank being foldable about the fold lines to form a holder for holding a plurality of planar objects in side-by-side relationship, and a first inner panel which is receivable within the holder formed from the folded blank to divide the holder into two compartments, the inner panel having a plurality of laterally spaced slots for receiving planar objects and locating them in the holder.

The handling means of this invention may be used for handling planar objects which are to be stored in laterally spaced side-by-side relationship to protect the planar objects, to have the planar objects readily accessible for use and/or to have the planar objects in a desired attitude for use.

In an embodiment of the invention the handling means may be suitable for use in handling planar objects in the form of photographic slides.

In this embodiment of the invention, the dimensions of the outer wall panels, the inner panel and the slots may be appropriate for accommodating or snugly accommodating photographic slides.

In this embodiment of the invention the outer wall panels may conveniently be in the form of elongated outer wall panels having their elongated edges defined by the fold lines, so that an elongated rectangular holder can be formed from the folded blank.

The first inner panel may have a fold line which intersects the slots and extends normally to the slots to allow the panel to be folded into a panel of V-section.

In this embodiment of the invention the handling means may include a reinforcing panel which is adapted to be secured to the first inner panel to maintain it in it folded condition.

The reinforcing panel may conveniently have one edge zone secured to the first inner panel on one side of the slots, and may be adapted to have an opposed edge zone secured to the first inner panel on the other side of the slots to maintain the first inner panel in its folded condition.

The reinforcing panel may be adapted to be secured to the first inner panel by means of at least one pressure sensitive adhesive strip, by means of securing clips or pins, by means of complementary ears and slots, or the like.

In an embodiment of the invention, the first inner panel may form an integral part of the blank, and may be positioned to lie within the holder when formed from the blank.

In an alternative embodiment of the invention, the first inner panel may be separate from the blank.

In this alternative embodiment of the invention, the first inner panel may be formed out of a material which is the same as the material from which the blank is formed, or which is a material which is loss flexible and/or stronger than the material of the blank.

In this embodiment of the invention, the reinforcing panel may form part of the blank, or may form part of or be integrally connected to the first inner panel.

The first inner panel may include reinforcing means to reinforce the edges defining the slots.

In one embodiment of the invention, reinforcing may be provided by having the inner panel coated with an adhesive plastics material, by having a plurality of elongated reinforcing wire loops arranged to define the outlines of the slots and secured to the inner panel and/or by having spaced wires secured to the inner panel at opposed ends of the slots to reinforce the opposed end zones of the slots.

In an embodiment of the invention, where the first inner panel does not form an integral part of the blank, the first inner panel may be formed out of an elongated wire which is bent or coiled to define the slots.

In this embodiment of the invention, the elongated wire may be of metal, of a metal alloy, or of a synthetic plastics material. The wire may, if desired, be resiliently flexible.

The handling means may include a second inner panel which is receivable within the holder formed from the folded blank so that the two inner panels divide the holder into three compartments, the second inner panel having slots corresponding to those of the first inner panel, with the slots being arranged to be in register with the slots of the first inner panel in the holder.

In an embodiment of the invention, the second inner panel may form an integral part of the blank, and may be positioned to lie within the holder when formed from the blank.

In an alternative embodiment of the invention, the second inner panel may be separate from the blank.

In this alternative embodiment of the invention, the second inner panel may be integrally connected to the first inner panel, where the first inner panel does not form an integral part of the blank.

In this alternative embodiment of the invention, the first and second inner panels may be in the form of a removable unit which can be inserted into or removed from the holder as required.

In this alternative embodiment of the invention, the first and second inner panels may be moulded out of a suitable synthetic plastics material, may be formed out of folded sheet material, or may be formed out of a folded or helically wound wire.

The first and second inner panels in this alternative embodiment of the invention, may be collapsible into a flattened condition.

The second inner panel may conveniently have securing means for securing it in its operative position in the holder.

The securing means may conveniently be in the form of a pressure sensitive adhesive strip. Alternatively, however, it may be in the form of securing means as hereinbefore described.

The blank may conveniently be divided into at least four outer wall panels which are arranged to allow the blank to be folded into a closed holder.

The blank may include two opposed end wall panels which are positioned for folding to close opposed ends of the holder formed from the blank.

Each end wall panel may have integrally formed tabs which can be bent over and secured together so as to form a cap-like end cover for the holder.

The blank of this invention may have package fold lines at spaced intervals to divide the blank into alternate wide and narrow package panels thereby allowing the blank to be folded into a flattened package of rectangular section for housing a plurality of stacks of planar objects, with the planar objects of each stack lying in a plane parallel to the package fold lines.

It will be appreciated that some of the package fold lines may coincide with the fold lines of the blank which define the outer wall panels.

The blank of this invention may be made of various materials. Thus, for example, it may be made of cardboard, paper, reinforced paper, synthetic plastics material, or a combination or composite of two or more of these materials.

The fold lines which define edges of the panels may be in the form of actual fold lines, or in the form of crease lines, score lines, or lines of weakening.

The invention further extends to a holder for holding planar objects, whenever formed from the handling means as described herein.

The invention further extends to a flattened package for housing planar objects whenever formed from the handling means as described herein.

The invention further extends to a photographic slide holder for holding photographic slides, and comprising an elongated container having its interior divided into two compartments by means of a first internal longitudinally extending partition, the partition having a plurality of laterally spaced transversely extending slots for receiving photographic slides and locating them in position in the container.

The photographic slide holder may conveniently have a second internal longitudinally extending partition spaced from the first partition, the second partition having slots corresponding to those of the first partition with the slots being arranged to be in register with the slots of the first partition.

The photographic slide holder may conveniently have a closable lid for closing the container, with the lid being capable of being opened to afford access to the interior of the container.

The photographic slide holder may conveniently be of unitary construction, being formed from a folded blank.

The invention further extends to a method of handling photographic slides, which includes the step of supplying processed slides to owners of such slides, in a holder as hereinbefore described, or in a flattened package as hereinbefore described.

The recipients of such processed slides can then store the slides in the holder in accordance with this invention. When required for use, a conventional slide carrier can be aligned with the holder and they can then be inverted to allow the photographic slides to fall into the appropriate slots in the slide carrier in an appropriate attitude for use.

After viewing of the slides, they can be re-transferred from the conventional slide carrier to the holder in the same way.

The blank of this invention may be provided with index zones which are in line with the slots to allow individual slides contained in the slots to be identified in their corresponding index zones.

An embodiment of the invention is now described by way of example with reference to the accompanying drawings.

Figure 4:
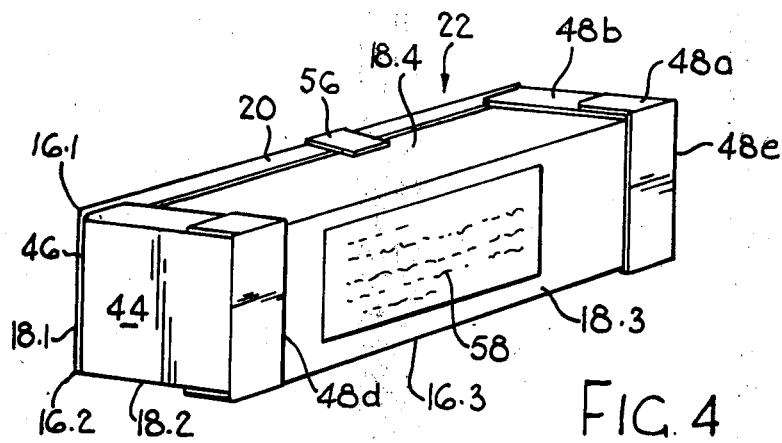
FIG. 4 shows a three dimensional view of a holder for holding photographic slides in side-by-side relationship, formed from the folded blank of FIGS. 1 to 3 of the drawings.
Figure 5:
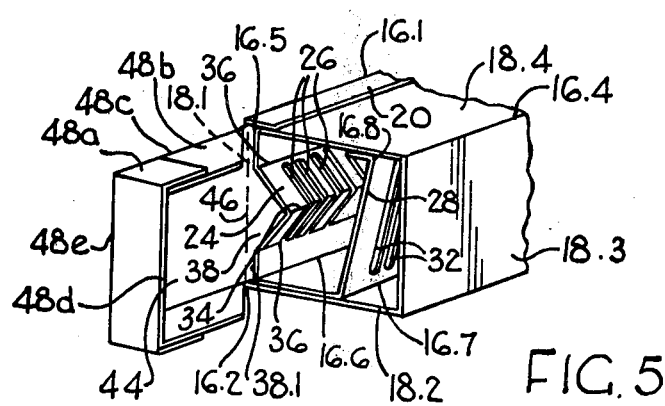
FIG. 5 shows a view corresponding to that of FIG. 4, of the holder having its one end open.
Figure 6:
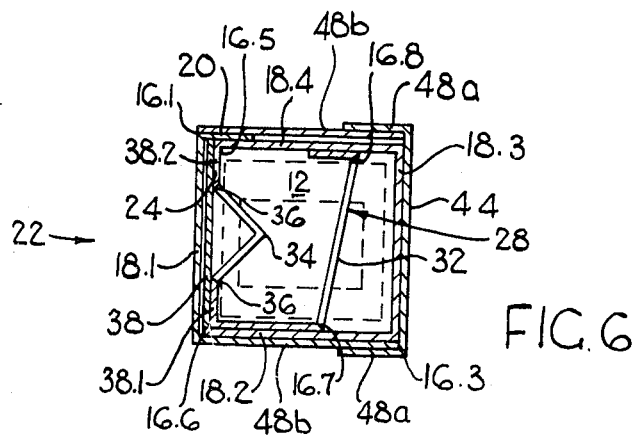
FIG. 6 shows a cross-sectional view of the holder of FIGS. 4 and 5, with a photographic slide shown in position therein in dotted lines.

With reference to the drawings, reference numeral 10 refers generally to handling means for use in handling planar objects in the form of photographic slides 12, and comprising a blank 14 having a plurality of laterally spaced fold lines 16.1, 16.2, 16.3, 16.4 and 16.5 to divide the blank 14 into a series of elongated outer wall panels 18.1, 18.2, 18.3 and 18.4 and an elongated closure edge 20, the blank 14 being foldable about the fold lines 16 to form a holder 22 as shown in FIGS. 4 to 6 of the drawings, for holding a plurality of photographic slides 12 (as shown in FIG. 6) in side-by-side relationship.

The blank 14 further has a fold line 16.6 which, together with the fold line 16.5, defines an elongated first inner panel 24 between them.

The first panel 24 is positioned on the blank 14 so that when the blank is folded to form the holder 22, the first inner panel 24 will be positioned within the holder 22 as can be seen in FIGS. 5 and 6.

The first inner panel 24 has a plurality of laterally spaced, transversely extending slots 26 for receiving the photographic slides 12 and locating them in position in the holder 22.

The blank 14 has further fold lines 16.7 and 16.8 which define a second inner panel 28 between them.

The fold line 16.8 further defines a securing panel 30 for the second inner panel 28.

The second inner panel 28 is positioned to again lie within the holder 22 when the blank is folded to form the holder 22, as can be seen in FIGS. 5 and 6 of the drawings.

The second inner panel 28 has slots 32 for receiving the photographic slides 12, with the slots 32 being positioned to be in register with the slots 26.

The first inner panel 24 has a centrally positioned fold line 34 which intersects the slots 26 and extends normally to the slots 26 to allow the panel 24 to be folded into a panel of V-section as can be seen in FIGS. 5 and 6.

For such folding of the first inner panel 24, the panel 24 further has fold lines 36 extending along the panel 24 on opposed sides of the slots 26.

The handling means 10 includes a reinforcing panel 38 for maintaining the first inner panel 24 in its folded condition where it is of V-section, within the holder 22.

The reinforcing panel 38 has its one edge zone 38.1 secured to the underside of the blank by means of an adhesive in the zone between the fold line 16.6 and the one fold line 36 adjacent the fold line 16.6.

The opposed edge zone 38.2 of the reinforcing panel 38 has a pressure sensitive adhesive strip 40 provided thereon (as can be seen particularly in FIG. 3), while the blank 14 has a corresponding pressure sensitive adhesive strip 42 provided on its underside between the fold line 16.5 and the one fold line 36 adjacent thereto.

Thus, when the first inner panel 24 is folded into a V-section panel, the pressure sensitive adhesive strip 40 can be engaged with the pressure sensitive adhesive strip 42 to maintain the first inner panel 24 in its folded condition.

The handling means 10 includes two opposed end wall panels 44 which extend outwardly from the reinforcing panel 38.

The end wall panels 44 are positioned for folding about fold lines 46 to close opposed ends of the holder 22.

Each end wall panel 44 has ears 48 and the outer panel 18.3 has corresponding slits 50 for receiving the ears 48 to locate the end walls 44 in their operative closed position as shown in FIG. 4.

The securing panel 30 is provided with a pressure sensitive adhesive 52 on the underside of the blank 14, whereas the blank 14 is provided with a corresponding pressure sensitive adhesive strip 54 on its upper face.

The pressure sensitive adhesive 52 can thus be secured to the pressure sensitive adhesive strip 54 when the blank 14 is folded to form the holder 22 thereby securing the second inner panel 28 in position within the holder 22 for use.

In use, for forming the holder 22, the first inner panel 24 can first be folded along the fold lines 34 and 36 and the pressure sensitive adhesive strip 40 can be engaged with the pressure sensitive adhesive strip 42.

Thereafter the blank can be folded along the fold lines 16.6, 16.7, 16.8 and 16.5, and the pressure sensitive adhesive 52 can then be secured to the pressure sensitive adhesive strip 54.

In this condition, the slides 12 can be loaded into the partly formed holder 22 by inserting them in their appropriate attitude, into the aligned slots 32 and 26.

Since the first inner panel 24 and the second inner panel 28 divide the interior of the holder 22 into three elongated compartments, the slides 12 will be securely located in laterally spaced, side-by-side relationship within the holder 22.

Thereafter the blank 14 can be folded along the fold lines 16.4, 16.3, 16.2 and 16.1, the closure edge 20 can be secured to the outer panel 18.4 by means of an adhesive strip 56, and the end wall panels 44 can then be folded to close the opposed ends of the holder 22, and the ears 48 can be engaged in the slits 50.

In the closed condition of the holder 22, the slides 12 can be securely stored and, if desired, the holder 22 can be mailed in this form. For this purpose, an address panel 58 may be provided on the outer wall panel 18.3.

The handling means 10 is conveniently of a suitable size to accommodate conventional slides 12, and conveniently has 36 slots 26 and slots 32 for housing 36 photographic slides. For the sake of clarity, a lesser number of slots 26 and slots 32 have been shown in the drawings.

For use of the stored slides 12, the holder 22 can be partly opened to expose the slides 12 and a conventional slide carrier can be aligned with the holder. Thereafter the holder and slide carrier can be inverted to allow the slides 12 contained in the holder, to fall into the appropriate slots in the conventional slide carrier. By arranging the slides 12 in an appropriate attitude in the holder 22, the slides will be in the proper attitude in the conventional slide carrier for viewing in a conventional projector.

After the slides have been used, they can be retransferred to the holder 22 in the same way and the holder 22 can then again be closed for storage.

The embodiment of the invention as illustrated in the drawings therefore provides the advantage that a relatively inexpensive and effective handling means is provided for handling and storing photographic slides, and that the owner of such slides can therefore make do with far fewer conventional slide carriers for viewing the slides, than would otherwise have been the case.

The embodiment of the invention as illustrated in the drawings provides the further advantage that the slides 12 can be stored in the holder 22 in the proper attitude so that when transferred to a conventional slide carrier, they will automatically be in the correct attitude for viewing in a conventional projector.

The material from which the blank 14 is formed may be any material which has a sufficient strength to provide the holder 22 with a reasonable service life. Apart from this consideration, the major consideration would tend to be cost.

The blank 14 may therefore conveniently be formed out of a suitable cardboard or reinforced paper. In this event the first inner panel 24 and the second inner panel 28 may be reinforced to combat tearing of the edges defining the slots 26 and 32.

Such reinforcing may conveniently be effected by coating with a suitable reinforcing coating, such as a coating of synthetic plastics material.

The blank 14 may be formed by cutting or punching it and the reinforcing panel 38 with the end wall panels 44 out of suitable sheet material.

The various fold lines may be formed by any conventional means, and the slots 26 and 32 may be formed by punching or by rotary cutting means of conventional type.

Figure 7:
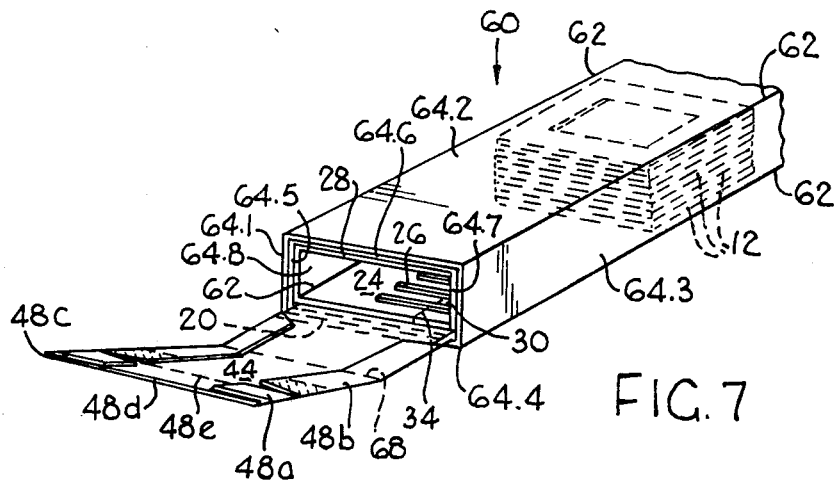
FIG. 7 shows a three dimensional view of a flattened rectangular package formed from the blank of FIGS. 1 to 3, with its one end open, and with a plurality of photographic slides stacked therein.

The facilitate mailing of the handling means 10 and processed slides 12 from a processing laboratory to an owner, the blank 14 may be folded by the processing laboratory into a flattened rectangular package 60 as shown in FIG. 7 of the drawings.

Figure 9:
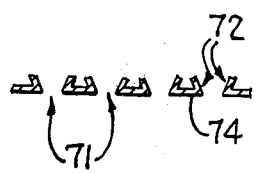
FIG. 9 shows a cross-section view of the modification shown in FIG. 8 taken along the line IX—IX.
Figure 8:
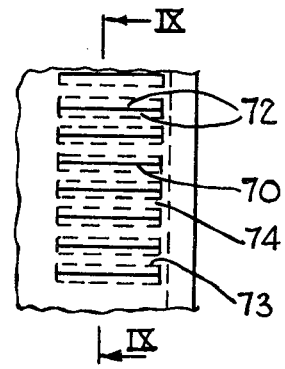
FIG. 8 shows a modification of a detail of the construction shown in FIGS. 1 and 2.

Alternatively, and as shown in FIGS. 8 and 9 of the drawings the slots can be formed by cutting I-profile slits 70 in the panels 24 and 28.

As seen in the drawings, to form slots 71, the slits 70 are made and the flaps of material 72 along the edges of the slits 70 are folded along fold lines 73 to one side of the panel as shown in FIG. 9. To permit folding of the panel 24 along the fold line 34 which intersects the slots 71 the slits 70 may include a central portion 74, shown in broken lines in FIG. 8.

Thus the processing laboratory will fold the blank 14 into the flattened package 60 and post the flattened package 60 containing the processed slides 12 to the owner in this form.

The owner upon receiving the flattened package 60 can then unfold it, and refold it into the form of the holder 22 for storing the slides 12.

Figure 1:
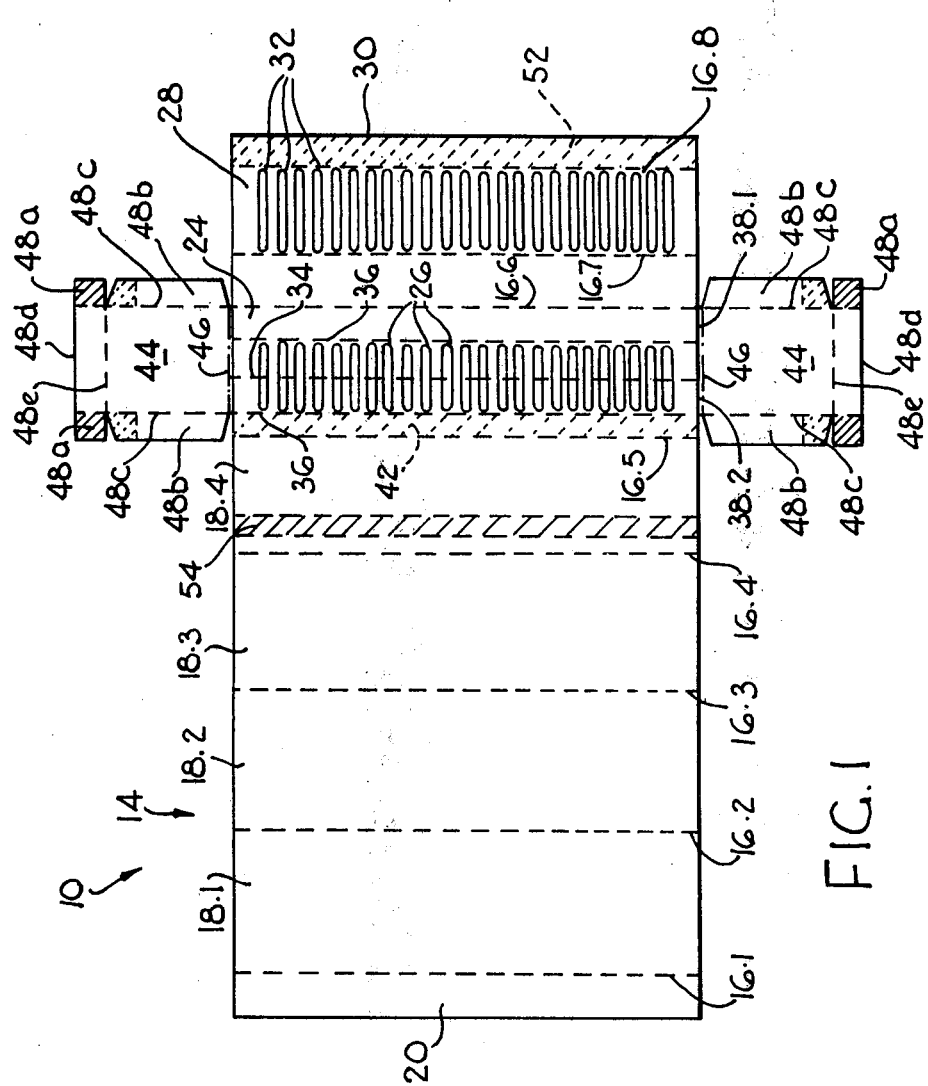
FIG. 1 shows a diagrammatic plan view of handling means for use in handling planar objects in the form of photographic slides, and comprising a blank adapted to be folded to form a holder for holding a plurality of photographic slides in side-by-side relationship, with the package fold lines for forming the blank into a flattened rectangular package being omitted for the sake of clarity.

For the sake of clarity, the blank 14 as illustrated in FIG. 1 of the drawings, contains only the fold lines as hereinbefore described and the package fold lines for forming the blank 14 into the flattened package 60 have been omitted.

Figure 2:
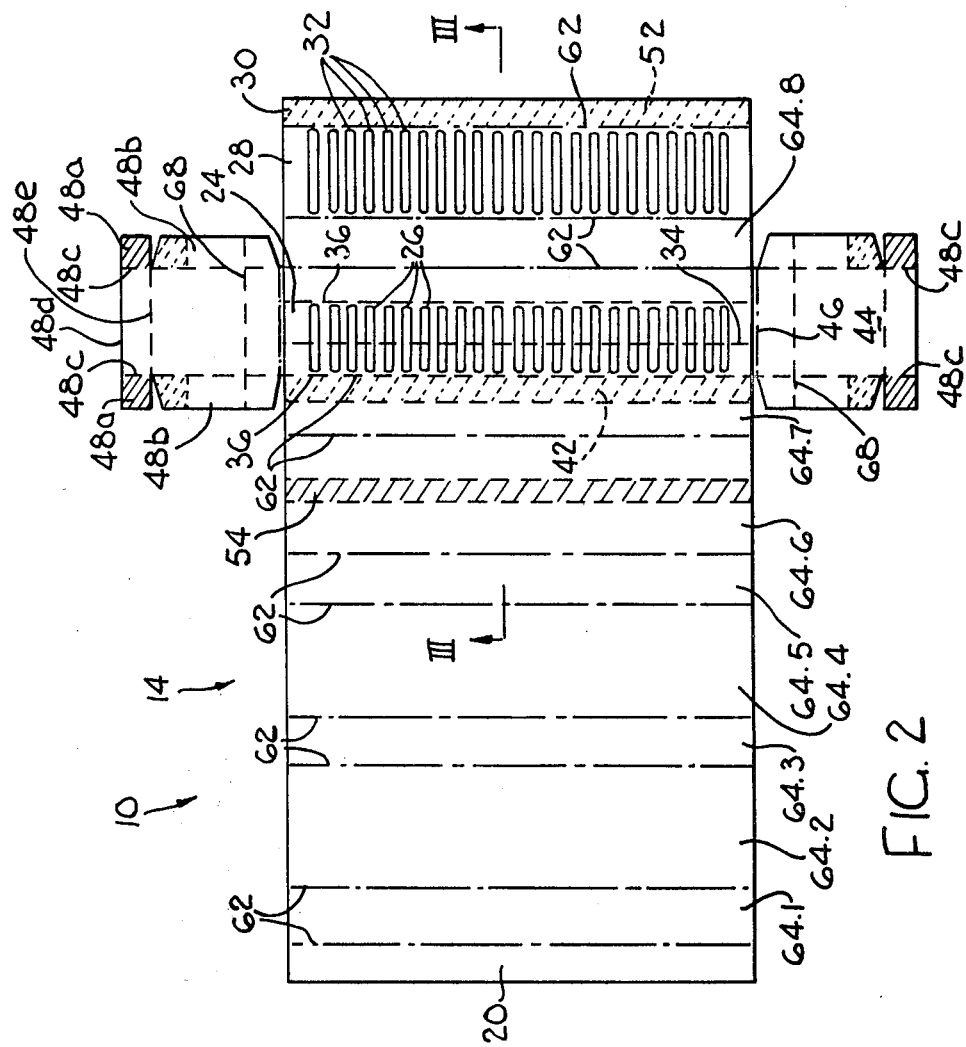
FIG. 2 shows a diagrammatic plan view of the blank of FIG. 1 with the fold lines of the blank of FIG. 1 emitted for the sake of clarity, and showing the package fold lines of the blank for folding the blank into a flattened rectangular package.
Figure 3:
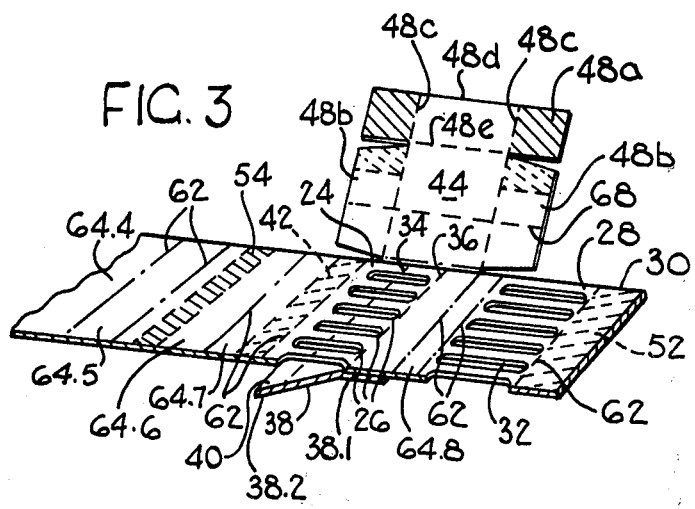
FIG. 3 shows a fragmentary cross sectional view of the blank of FIG. 2, along line III—III of FIG. 2.

For the sake of clarity therefore, the blank 14 as illustrated in FIGS. 2 and 3 of the drawings, does not show the fold lines of the blank illustrated in FIG. 1, but merely shows, in chain dotted lines, the package fold lines required for folding the blank 14 into the form of the flattened rectangular package 60 of FIG. 7.

It will be appreciated however that some of the fold lines of FIG. 1 coincide with some of the package fold lines of the blank 14 of FIGS. 2 and 3.

In practice, to facilitate formation of the holder 22, the method of folding and the particular fold lines to be used for forming the holder 22, will be clearly indicated on the blank 14.

With reference to FIGS. 2, 3 and 7 of the drawings, the blank 14 has package fold lines 62 which divide the blank 14 into alternate narrow and wide package panels 64.1, 64.2, 64.3, 64.4, 64.5, 64.6, 64.7, 24, 64.8, 28 and 30 and the closure edge 20.

The end wall panels 44 have an additional fold line 68 for folding them to close the opposed ends of the flattened package 60.

As can be seen in FIG. 7 of the drawings, the fold lines 62 are spaced so that the flattened package 60 has appropriate dimensions for accommodating four stacks of slides 12 along its length, with each stack comprising nine stacked slides 12. The flattened package 60 thus accommodates 36 slides, with each slide 12 lying in a plane parallel to the package fold lines 62. Furthermore in this condition of a flattened package and as seen in FIG. 7 the tabs 48a and 48b are bent over to abut the end panels 44 which are then bent over their fold lines 68 so as to close the ends of the package 60.

As an alternative to forming the blank of carton it may be formed of a plastics material using an injection molding, die casting or extrusion molding technique and if necessary a sawing, grinding or like technique for slot forming. Furthermore the use of an elastic material can be envisaged thereby allowing for the variation of the spacings between adjacent stored objects.

The embodiment of the invention as illustrated in the drawings therefore provides the further advantage that the blank 14 can be folded by a processing laboratory into the flattened package 60, the 36 processed slides can then be noted in the flattened package 60, and it can then be mailed in that form to the owner. Such a flattened package is of a suitable size for mailing and for mail slots, and can then be assembled by a recipient to form the holder 22 for storing the slides 12 in the appropriate attitude.

The embodiment of the invention as illustrated in the drawings provides the further advantage that the blank 14 can be manufactured easily and relatively inexpensively, and can be used competitively and to good advantage in place of the normal types of packages used by processing laboratories to dispatch processed slides to their owners.

Such recipients can then have a slide holder 22 available for storing the slides in the appropriate attitude, thereby providing a substantial saving of cost for owners of slides since their requirements for relatively more expensive conventional slide holders will be drastically reduced.

The embodiment of the invention as illustrated in the drawings therefore provides the further advantage that processing laboratories using handling means in accordance with this invention, will have a competitive advantage over competitors using normal slide packages for transmitting processed slides to their owners.

I claim:

1. A blank for constructing a holder comprising:
blank material of rectangular shape, said material including a first set of a plurality of parallel fold lines parallel to one edge of said blank material, two of said fold lines forming first and second flaps at opposite edges of said blank material, said fold lines forming a plurality of panels between said flaps, one of said panels adjacent one of said flaps having a plurality of transverse slits extending the width of said panel, a second of said panels separated from said one panel by a third panel, said second panel also having a plurality of slits in line with said first plurality of slits, said second panel being foldable at the center of said panel and at the ends of said slits, said third panel having a width narrower than the width of the remaining of said panels;
first and second end walls foldable connected to said blank material adjacent said second panel, whereby the remaining of said panels and the remaining of said flaps are foldable along said fold lines forming an enclosure having ends closed by said end walls and square in cross-section;
said one, second, and third panels and said one flap folded to form an interior lining for said enclosure with the slits of said one and second panels opposite each other for retaining planar objects between said slits, and
said blank material including a second set of fold lines dividing said blank into another set of panels, said other set of panels being foldable into a receptacle having a rectangular section for storing planar objects.

2. The blank of claim 1, wherein said panels have dimensions for forming an enclosure suitable for holding photographics.

3. The blank of claim 1, wherein said second panel is folded along said center into a V-shape.

4. The blank of claim 1, wherein said first and second end walls are provided with foldable flaps.

5. The blank of claim 1, wherein said flaps are located on three free sides of said end walls providing for a shallow cap for enclosing ends of said panels.

6. The blank of claim 1, wherein an adhesive is applied to said blank for holding said formed enclosure together.

* * * * *